UNITED STATES PATENT OFFICE.

WILLIAM N. KOHLINS, OF NEWARK, NEW JERSEY.

LIQUID PAPER-FILLER AND PROCESS OF MAKING THE SAME.

1,261,135.     Specification of Letters Patent.     Patented Apr. 2, 1918.

No Drawing.     Application filed July 18, 1917. Serial No. 181,239.

*To all whom it may concern:*

Be it known that I, WILLIAM N. KOHLINS, a citizen of the United States, and a resident of Newark, Essex county, New Jersey, have invented new and useful Improvements in Liquid Paper-Fillers and Processes of Making the Same, of which the following is a description.

My invention relates to an improved paper filler which is especially adapted for use in coating paper to produce the high glossy surfaces required on paper for books, periodicals, catalogues, etc., to show up wood-cuts and photographic illustrations; and to the process of making such filler.

It is customary in providing paper with a glossy surface, such as described, to utilize a paper filler known to the trade as "satin white," in connection with china clay, blancfixe and other ingredients for coating the paper. The common form of "satin white" consists of a mixture of calcium sulfate, aluminum hydrate, calcium oxid and water and is produced by mixing a solution of sulfate of alumina, potash alum and natrium sulfate with calcium oxid; the mixture after a thorough washing being pressed to a very stiff pulp or paste, in which condition it is disposed of to the trade.

When "satin white" contains the ingredients of which it is composed in such proportions as to obtain best results from its use as a paper filler, it is made up of between 32% and 35% solid matter, the remainder being water. But previous to my invention "satin white" when its ingredients are in these proportions, has been in the stiff pulp or paste form referred to, and in order to render the same sufficiently fluid to be applied to the paper by brushing in the usual manner, it has been necessary to add a considerable quantity of water thereto. The addition of this water, however, destroys the proportions of solid matter and water with which the best results are obtainable. Moreover, "satin white" in the form of the stiff paste is difficult and uneconomical to handle, and the addition of the water thereto to render it sufficiently fluid for proper application to the papers to be treated, involves much trouble on the part of the user and the results obtained are not uniform.

I have discovered that by adding a very small amount of gum arabic, preferably in a dry and finely powdered state, to the ordinary paste form of "satin white" and mixing the same therewith, the stiff paste is quickly changed to a relatively thin liquid which will flow freely and the quality of which as a paper filler is much superior to that produced by liquefying the ordinary paste form of "satin white" by the addition of water. Moreover, "satin white" treated in this manner may be sold to the trade in the form of "liquid satin white" in which condition it is much easier and more economical to handle. One of the reasons why this "liquid satin white" is of superior quality is due to the fact that the amount of gum arabic which it is necessary to add to the paste form of "satin white" in producing the same, is so small that the proportions of solid matter and water are not substantially changed.

I am unable to state at the present time just what the chemical action, if any, is that takes place on the addition of the gum arabic to the paste form of "satin white," but the conversion thereby of the paste into a thin liquid is very rapid and is accompanied with no substantial change in the proportions of solid matter and water.

I have found that if a mixture of gum arabic and dextrin, also preferably in a dry and powdered state, is used instead of the gum arabic alone, the "liquid satin white" produced on treating the paste form of "satin white" therewith will be of a still better quality. I have also discovered that the product will be further improved by the use of a mixture of gum arabic, dextrin and a very small amount of saccharin, also preferably in a dry and powdered form. To obtain good results, the substance consisting either of gum arabic alone, or of a mixture of gum arabic and dextrin, or of a mixture of gum arabic, dextrin and saccharin should be mixed with the paste form of "satin white" in the proportions of about 100 parts of "satin white" to less than three parts of such substance. Where this substance consists of gum arabic, dextrin and saccharin, I preferably add to 100 parts of the "satin white" a mixture containing two parts of gum arabic, one-tenth of one part of dextrin and one-hundredth of one part saccharin.

While I believe it preferable to add the gum arabic, or gum arabic and dextrin, or gum arabic, dextrin and saccharin in a dry powdered state to the paste form of "satin white" to liquefy the same, I find that good results may also be obtained by adding the same in a liquid form to the "satin white".

Having now described my invention, what I claim as new and desire to protect by Letters Patent of the United States is as follows:

1. The process of treating "satin white" to render the same fluid which consists in mixing therewith a substance containing gum arabic.

2. The process of treating "satin white" to render the same fluid which consists in mixing therewith a substance containing gum arabic and dextrin.

3. The process of treating "satin white" to render the same fluid which consists in mixing therewith a substance containing gum arabic and saccharin.

4. The process of treating "satin white" to render the same fluid which consists in mixing therewith a substance containing gum arabic, dextrin and saccharin.

5. The process of liquefying "satin white" which consists of mixing therewith gum arabic in a dry state.

6. The process of liquefying "satin white" which consists of mixing therewith gum arabic and dextrin in a dry state.

7. The process of liquefying "satin white" which consists of mixing therewith gum arabic and saccharin in a dry state.

8. The process of liquefying "satin white" which consists of mixing therewith gum arabic, dextrin and saccharin in a dry state.

9. A paper filler comprising a mixture of "satin white" and gum arabic.

10. A paper filler comprising a mixture of "satin white", gum arabic and dextrin.

11. A paper filler comprising a mixture of "satin white", gum arabic and saccharin.

12. A paper filler comprising a mixture of "satin white", gum arabic, dextrin and saccharin.

13. A paper filler comprising a mixture in substantially the proportions of one hundred parts of "satin white" to less than three parts of gum arabic.

14. A paper filler comprising a mixture in substantially the proportions of one hundred parts of "satin white" to less than three parts of gum arabic and dextrin.

15. A paper filler comprising a mixture in substantially the proportions of one hundred parts of "satin white" to less than three parts of gum arabic and saccharin.

16. A paper filler comprising a mixture in substantially the proportions of one hundred parts of "satin white" to less than three parts of gum arabic, dextrin and saccharin.

This specification signed and witnessed this 16th day of July, 1917.

WILLIAM N. KOHLINS.

Witnesses:
JACOB SCHNEIDER,
PHILIP P. VAN DUYNE.